United States Patent Office 2,863,111
Patented Dec. 2, 1958

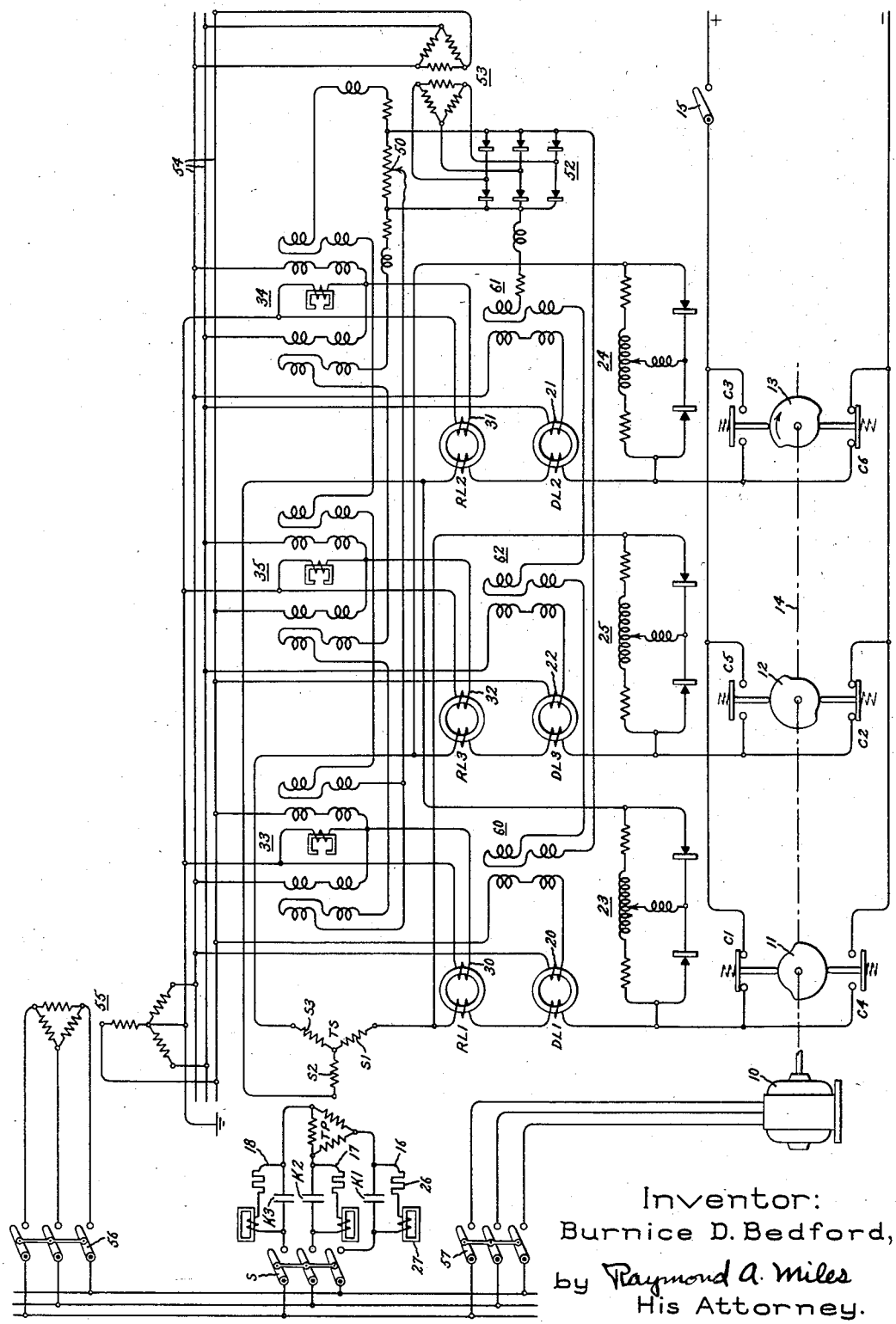

2,863,111

SERIES CAPACITOR SATURABLE TRANSFORMER CIRCUIT PROTECTIVE SYSTEM

Burnice D. Bedford, Scotia, N. Y., assignor to General Electric Company, a corporation of New York Application June 28, 1954, Serial No. 439,614

8 Claims. (Cl. 321—48)

The invention relates to protective systems for electric circuits, particularly alternating current circuits including a transformer and a series capacitor on which a charge may remain trapped upon a sudden decrease of the transformer load current. In such circuits, abnormal asymmetrical current pulsations may occur capable of saturating the transformer if the voltage of the series capacitor becomes sufficiently asymmetrical due to a trapped charge.

The principal object is to provide an improved protective system suitable for preventing the saturation of the alternating current transformer by the unidirectional current component produced by the asymmetrical voltage of the capacitor in series circuit with a winding of the transformer upon a sudden substantial decrease of the transformer current.

Another object is to provide an improved selective discharge circuit in shunt with the capacitor and including a reactor saturable only in response to asymmetrical capacitor voltages and a damping resistor to prevent oscillatory discharge of the trapped charge of the capacitor by controlling the rate of discharge.

The improved protective system of the present invention, although not limited thereto, is particularly adapted for preventing saturation of a transformer supplying the load current of a mechanical contact rectifier of the improved series capacitor commutating voltage producing type such as described and claimed in Patent 2,797,381 issued to A. Schmidt, Jr. on June 25, 1957. As pointed out hereinafter, the saturation of the transformer of such mechanical rectifier is likely to produce an arc back upon a sudden decrease in the rectifier load current with resultant damage or destruction of the rectifier contacts.

Thus, a special object is to provide an improved protective system for selectively and effectively discharging the commutating voltage producing series capacitors of a mechanical contact rectifier before saturation of an alternating current transformer supplying the rectified load current can occur upon a sudden substantial decrease of the rectified load current.

In any circuit including an alternating current transformer and capacitor in series the voltage wave form of the series capacitor temporarily will become asymmetrical upon any sudden substantial decrease of the transformer load current due to the so-called "trapped" charge of the capacitor. As a result of such trapped charge, a unidirectional current component is produced by the series capacitor and may persist in the transformer circuits for a sufficient time to saturate the transformer.

Whenever an alternating current transformer becomes saturated undesirable and even dangerous current surges and phase disturbances may be produced in either or both the transformer primary and secondary circuits by the resulting wide variation of the transformer impedance. Yet, any ordinary transformer energized from an ordinary commercial alternating current circuit may have a saturating voltage only 120% of the normal alternating energizing circuit voltage. But the same transformer will become saturated whenever energized for a relatively short interval with a relatively small direct voltage, even about 1% of the normal alternating energizing circuit voltage. Consequently, when a capacitor is connected in series with a winding of the transformer and the transformer load current suddenly decreases, the resulting trapped charge on the capacitor may produce saturation of the transformer unless the trapped charge is rendered ineffective before the saturation of the transformer occurs.

Thus, to protect against saturation of the transformer selective and prompt removal of a trapped charge from the series capacitor is most desirable particularly in service where an abrupt dropping of the transformer load or other sudden substantial decrease of the transformer current may occur.

Hence, another object is to provide a selective shunt discharge circuit for the series capacitor including in series a damping resistor and a saturable reactor having a relatively lower saturating voltage than the transformer so as to selectively produce a damped discharge of the capacitor before saturation of the transformer can occur upon any sudden substantial decrease of the transformer load current.

A further object is to proportion the improved protective system so that the saturating voltage of the reactor in the selective shunt discharge circuit is relatively higher than the series capacitor normal effective voltage produced by the full or maximum load current of the transformer and relatively lower than the saturating voltage of the transformer. Thus the reactor is proportioned to saturate only in response to asymmetrical capacitor voltages.

With such selective proportioning under all normal transformer current conditions up to the full or maximum load, as long as the current is relatively steady or changes only gradually, the saturable reactor will remain unsaturated and the capacitor shunt discharge circuit will thereby be maintained relatively inactive or ineffective. But, whenever any sudden substantial load decrease occurs the resultant trapped charge on the capacitor will result in asymmetrical capacitor voltages capable of producing a unidirectional current component that will cause the reactor to saturate and thereby promptly produce a damped discharge of the series capacitor before the saturation of the transformer can occur.

The novel features of the improved protective system of the present invention are set forth with particularity in the appended claims. The components of the system, however, both as to their organization and method of operation together with further objects and advantages thereof may be best understood by reference to the following description taken in connection with the accompanying drawing in which the single figure is a schematic circuit diagram of a mechanical contact rectifier embodying the improved series capacitor saturable transformer circuit protective system of the present invention as is shown in the drawing.

As shown in the single figure of the drawing, energy is transmitted from the 3-phase alternating current power supply lines 1, 2, and 3 through suitable disconnecting switches or circuit breakers S, the delta connected transformer primary windings TP, the Y-connected transformer secondary windings TS, the commutating voltage supply series capacitors K1, K2, K3, the load voltage controlling or retard reactors RL1, RL2, and RL3, the commutating or drag out reactors DL1, DL2, DL3, and the series of synchronously closing and opening rectifier contacts C1, C5, C3, and C4, C2, C6 to the variable direct current load circuit indicated as + and —. The series commutating capacitors K1, K2, K3 preferably are provided in accordance with the invention described and claimed in the aforementioned Schmidt, Jr. Patent 2,797,381, in order to permit preclosing of the rectifier contacts before the incoming phase to neutral voltage equals the outgoing phase to neutral voltage so as to substantially neutralize the line-to-line voltage commutating action. This enables the series capacitors K1, K2, and K3 that are charged in accordance with the variable load current to supply a correspondingly variable commutating voltage to effect transfer of the widely variable load current from the outgoing phase contact to the incoming phase contact during a constant or fixed contact overlap period.

As illustrated in the single figure the contacts C1, C5, and C3 serve to connect the successive phase circuits or windings S1, S2, S3 of the transformer secondary winding TS to the positive load current line + and the contacts C4, C2, and C6 serve to connect the successive phase circuits or windings to the negative load line. These contacts are periodically closed and opened in synchronism with the poly-phase voltages of supply lines 1, 2, 3 by means of the synchronous motor 10 that is energized preferably through a step-down transformer not shown and switch 57 from the alternating current supply lines 1, 2, 3 and drives suitable contact operating mechanism indicated schematically as the equiangularly displaced cams 11, 12, and 13 on the shaft 14 and the reciprocating push rods co-operating therewith so as to overlap the closing and opening of the contacts C1 to C6 to provide contact conduction and overlap periods of fixed duration. The contact operating mechanism may be of the improved form described and claimed in Patent 2,713,095 issued to H. P. Fullerton on July 12, 1955. If desired, the timed sequence of the contact overlaps may be synchronized in such manner that the points of equality of the successive phase to neutral voltage occur substantially in or slightly before the middle of the contact overlap periods so that the line-to-line commutating voltage impressed on the overlapping contacts will reverse at these points in accordance with the principle of the previously mentioned Schmidt invention.

Each phase circuit or phase winding S1, S2, S3 of the rectifier is provided with a corresponding one of the commutating or drag out reactors DL1, DL2, DL3 having corresponding magnetization control or biasing windings 20, 21, 22 and also with a corresponding one of the improved current diverting or voltage limiting circuit indicated generally by the reference characters 23, 24, and 25 arranged to cooperate with the drag out reactors to produce sparkless opening and closing of the corresponding pairs of contacts C1 and C4, C3 and C6, C5 and C2 that connect the respective phase windings S1, S2, S3 sequentially to either the positive or negative load lines indicated as + or —.

The current diverting and voltage limiting circuit indicated generally by the reference character 23 is interconnected between the contact C1 and contact C3 in order to co-operate with the drag out reactor DL1 in eliminating sparking upon opening of the contact C1.

This improved current diverting and voltage limit circuit is more fully described and claimed in the copending application of Bedford and Kuenning, Serial No. 424,088, filed April 14, 1954, and assigned to the assignee of the present invention.

In further accordance with the Bedford and Kuenning invention, the output voltage of the rectifier is controlled by means of the retard reactors RL1, RL2, and RL3 that are connected in series with the commutating reactors DL1, DL2, and DL3 in the phase winding circuit S1, S2, and S3. These retard reactors are provided respectively with magnetization biasing windings 30, 31, and 32 which are adjustably excited with a small square wave of current from the square wave generators 33, 34, and 35 in the manner more fully explained in the Bedford and Kuenning application.

In a similar way, adjustment of the potentiometer sliding contact 50 shown in Fig. 1 will simultaneously vary the square wave output of the generators 33, 34, and 35. This will vary or adjust the energization of the biasing windings 30, 31, and 32 of the retard reactors RL1, RL2, and RL3, so as to either increase or decrease the output voltage of the rectifier. The potentiometer 50 is energized through the bank of 3-phase rectifiers 52 from the transformer 53, which in turn is energized from the 3-phase buses 54 supplied through the transformer 55 and switch 56 from the alternating supply lines 1, 2, and 3. The rectifier bank 52 also supplied D. C. excitation to the square wave generators 60, 61, and 62 that serve to provide square wave energization respectively for the bias windings 20, 21, and 22 of the commutating or drag out reactors DL1, DL2, and DL3.

In the operation of the improved mechanical rectifier equipment shown in the drawing, one important limitation was found. This limitation was in the ability of the rectifier equipment to remain in operation after the load had been dropped by opening the D. C. circuit breaker 15. It was found that if the load was greater than about 50% of rating, an arc back was almost sure to occur upon disconnection of the load.

From oscillograms taken during a sudden decrease in the load of the mechanical contact rectifier, it became evident that the asymmetrical voltage component resulting from the trapped charge on the series capacitors K1, K2, K3 saturated the power transformer by unidirectional energization of the transformer primary windings TP. The strongest evidence for this was the fact that the arc back never occurred immediately when the load was disconnected but was usually about four to eight cycles later.

This arc back difficulty was effectively overcome in accordance with the present invention by providing the shunt discharge circuits 16, 17, and 18 for the series capacitors K1, K2, and K3 respectively. As shown the shunt discharge circuit 16 includes the damping resistor 26 and the saturable reactor 27 in series therewith. The damping resistor 26 provides a place to dissipate the trapped charge of the capacitor K1. The saturable reactor 27 serves to selectively render the shunt discharge circuit ineffective under normal current conditions and effective only when a charge is trapped on the capacitor K1 due to a sudden decrease of the load current. In order to accomplish this result the reactor 27 has its saturating characteristics so proportioned that under steady or gradually changing load conditions it substantially remains unsaturated as long as the load current is less than the 125% of the full load, but becomes saturated only in response to asymmetrical capacitor voltages before the saturation of the transformer TP occurs when a charge is trapped on the capacitor K1 upon a sudden substantial decrease of the load current. After the reactor 27 saturates, the value of the damping resistor 26 is such that the capacitor K1 will be effectively discharged in substantially one and one-half cycles with a normal 60-cycle alternating current energizing the circuit of transformer TP.

It was found that by the installation of the series capacitor shunt discharge circuits 16, 17, and 18, it became entirely practical to disconnect as much as 150% of the rated load of the mechanical rectifier by opening the direct current load circuit breaker 15 without the occurrence of any arc back.

While I have shown and described a preferred form of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. In combination, an alternating current transformer, a capacitor connected in series with a winding of the transformer to be charged in accordance with the transformer current, and a damped discharge circuit in shunt with the capacitor and including a reactor having a saturating voltage relatively greater than the capacitor voltages normally produced by the current of the transformer and lower than the saturating voltage of the transformer for selectively producing a damped discharge of the capacitor to prevent saturation of the transformer by the unidirectional current component produced by the capacitor upon a sudden substantial decrease of the transformer current.

2. In combination, an alternating current transformer, a capacitor connected in series with a winding of the transformer to be oppositely charged to voltages proportional to the transformer current, and a damped discharge circuit in shunt with the capacitor and including a reactor saturable only in response to asymmetrical capacitor voltages and having a relatively lower saturating voltage than the transformer to selectively discharge trapped charges on the capacitor before saturation of the transformer occurs upon a sudden substantial decrease of the transformer current.

3. In combination, an alternating current transformer, a capacitor connected in series with a winding of the transformer to be charged in accordance with the transformer current, and a discharge circuit in shunt with the capacitor including in series a damping resistor and a saturable reactor having a predetermined saturating voltage lower than the saturating voltage of the transformer and greater than the normal capacitor voltage for selectively producing a damped discharge of the capacitor upon a predetermined sudden decrease of the transformer current.

4. In combination, a polyphase alternating current transformer, a separate capacitor connected in series with a winding of a corresponding phase of the transformer to be charged proportionately to the current thereof, and a separate discharge circuit in shunt with each capacitor and including in series a damping resistor and a reactor saturable only in response to asymmetrical capacitor voltages and having a relatively lower saturating voltage than the transformer to selectively produce a damped discharge of the capacitors before saturation of the transformer occurs upon a sudden substantial decrease of the transformer current.

5. In combination, an alternating current transformer, a capacitor connected in series with a winding of the transformer to be oppositely charged to voltages proportional to the transformer current, and a shunt discharge circuit for the capacitor and including in series a damping resistor and a saturable reactor having a saturating voltage relatively higher than the capacitor voltage proportional to the transformer normal load current and relatively lower than the saturating voltage of the transformer to effectively discharge the capacitor before saturation of the transformer occurs upon a sudden substantial decrease of the transformer current.

6. A mechanical rectifier having in combination an alternating current transformer having synchronously operated contacts for commutating the load current and series capacitors oppositely charged proportional to the load current for providing commutating voltages and damped discharge circuits for the capacitors including reactors saturable only in response to asymmetrical capacitor voltages and having a relatively lower saturating voltage than the transformer for discharging the capacitors before saturation of the transformer occurs upon a sudden substantial decrease of the load current.

7. A mechanical rectifier having in combination an alternating current transformer provided with load current commutating means including synchronously operated contacts having series capacitors connected therewith for providing commutating voltages proportional to the load current, and shunting means for the capacitors including reactors saturable only in response to asymmetrical capacitor voltages and having damping resistors in series therewith for effectively discharging the capacitors before saturation of the transformer occurs upon a sudden substantial decrease of the load current.

8. A mechanical rectifier having in combination a polyphase alternating current transformer having synchronously operated contacts for commutating the load current, a separate capacitor connected in series with a winding of each phase of the transformer to be charged proportionately to the load current thereof, and a separate discharge circuit in shunt with each capacitor and including in series a damping resistor and a saturable reactor having a saturating voltage relatively higher than the capacitor voltage proportional to the transformer full load current and relatively lower than the saturating voltage of the transformer to effectively discharge the capacitor before saturation of the transformer occurs upon a sudden substantial decrease of the load current.

References Cited in the file of this patent

UNITED STATES PATENTS

| | | |
|---|---|---|
| 1,843,724 | Junken | Feb. 2, 1932 |
| 2,386,458 | Haug | Oct. 9, 1945 |
| 2,664,526 | Diebold | Dec. 29, 1953 |
| 2,697,198 | Schmidt et al. | Dec. 14, 1954 |

FOREIGN PATENTS

| | | |
|---|---|---|
| 213,121 | Switzerland | Apr. 16, 1941 |
| 723,928 | Germany | July 2, 1942 |
| 244,943 | Switzerland | Oct. 15, 1946 |